(12) United States Patent
Hangsleben

(10) Patent No.: US 9,871,548 B2
(45) Date of Patent: Jan. 16, 2018

(54) SECURE ELECTRONIC COMMUNICATION DEVICES

(71) Applicant: Dave W. Hangsleben, Las Vegas, NV (US)

(72) Inventor: Dave W. Hangsleben, Las Vegas, NV (US)

(73) Assignee: Hank Technology LLC, Grand Forks, ND (US)

( * ) Notice: Subject to any disclaimer, the term of this patent is extended or adjusted under 35 U.S.C. 154(b) by 0 days.

(21) Appl. No.: 15/098,813

(22) Filed: Apr. 14, 2016

(65) Prior Publication Data

US 2016/0309008 A1    Oct. 20, 2016

Related U.S. Application Data

(60) Provisional application No. 62/178,587, filed on Apr. 15, 2015.

(51) Int. Cl.
| | |
|---|---|
| *G06F 1/16* | (2006.01) |
| *H04M 1/18* | (2006.01) |
| *H04M 1/667* | (2006.01) |
| *E05B 73/00* | (2006.01) |
| *H04B 1/3888* | (2015.01) |

(52) U.S. Cl.
CPC ....... *H04B 1/3888* (2013.01); *E05B 73/0082* (2013.01); *G06F 1/1632* (2013.01); *H04M 1/18* (2013.01); *H04M 1/667* (2013.01)

(58) Field of Classification Search
CPC ............................ G06F 1/1632; E05B 73/0082
See application file for complete search history.

(56) References Cited

U.S. PATENT DOCUMENTS

| | | | |
|---|---|---|---|
| 6,009,169 A * | 12/1999 | Styron | H04M 1/18 |
| | | | 379/420.02 |
| 7,567,667 B2 * | 7/2009 | Frost | H04M 1/0297 |
| | | | 379/424 |
| 8,340,260 B1 | 12/2012 | Rae et al. | |
| 8,750,486 B1 | 6/2014 | Keiser | |
| 8,855,280 B1 | 10/2014 | Passe et al. | |
| 8,929,525 B1 | 1/2015 | Edwards | |

(Continued)

FOREIGN PATENT DOCUMENTS

| | | |
|---|---|---|
| CN | 202422200 | 9/2012 |
| CN | 203251372 | 10/2013 |

OTHER PUBLICATIONS sennco.com., "Lilitab Wall Pro", Retrieved from https://www.sennco.com/wp-content/uploads/2015/01/lilitab_Sennco_Wall_Pro_SellSheet.pdf, Also located at https://www.sennco.com/wp-content/uploads/2016/02/lilitab_Sennco_Wall_Pro_SellSheet.pdf, Apr. 23, 2015, 1 page.

(Continued)

*Primary Examiner* — Adrian S Wilson
(74) *Attorney, Agent, or Firm* — Brooks, Cameron & Huebsch, PLLC

(57) ABSTRACT

Secure electronic communication devices can, for example, include a baseplate, a base coupled to the baseplate, a housing disposed at least partially within a volume defined by the base, where the housing includes at least a portion of a cavity to house an electronic communication device, and a housing coupling member that rotatably couples the housing to the base.

20 Claims, 10 Drawing Sheets

(56) References Cited

U.S. PATENT DOCUMENTS

| | | | |
|---|---|---|---|
| 9,007,420 B1 | 4/2015 | Passe | |
| 9,055,167 B1* | 6/2015 | Keiser | H04M 15/08 |
| 9,577,694 B1* | 2/2017 | Albee | H04B 1/3877 |
| 2003/0112968 A1* | 6/2003 | Styron | H04M 1/0291 |
| | | | 379/441 |
| 2003/0227746 A1* | 12/2003 | Sato | G06F 1/1632 |
| | | | 361/679.57 |
| 2008/0266783 A1* | 10/2008 | Mills | G06F 1/1632 |
| | | | 361/679.44 |
| 2012/0033375 A1* | 2/2012 | Madonna | F16M 11/041 |
| | | | 361/679.43 |
| 2012/0212596 A1 | 8/2012 | Mathur | |
| 2012/0268878 A1* | 10/2012 | Smith | B60R 11/0252 |
| | | | 361/679.08 |
| 2013/0109253 A1 | 5/2013 | Gammon et al. | |
| 2013/0194377 A1 | 8/2013 | Humphries | |
| 2013/0263227 A1 | 10/2013 | Gongaware et al. | |
| 2014/0118930 A1* | 5/2014 | Sedon | E05B 73/0082 |
| | | | 361/679.56 |
| 2014/0218466 A1 | 8/2014 | Bloms et al. | |
| 2014/0266686 A1 | 9/2014 | Torgersrud et al. | |
| 2014/0328020 A1* | 11/2014 | Galant | F16M 11/105 |
| | | | 361/679.56 |
| 2014/0334610 A1 | 11/2014 | Hangsleben | |
| 2014/0362517 A1* | 12/2014 | Moock | E05B 73/0082 |
| | | | 361/679.43 |

OTHER PUBLICATIONS bouncepad.com., "Bouncepad Sumo, Secure iPad Stand and Tablet Mount", Retrieved from http://www.bouncepad.com/products/sumo-ruggedised-secure-ipad-tablet-stand, Apr. 23, 2015, 4 pages.

bouncepad.com., "Bouncepad Tilt, Tablet Kiosks with Tilting Screen", Retrieved from http://www.bouncepad.com/us/product/tablet-kiosk-with-tilt-screenmovement, Apr. 23, 2015, 3 pages.

* cited by examiner

SECURE ELECTRONIC COMMUNICATION DEVICES

CROSS-REFERENCE TO RELATED APPLICATION

This application claims priority to U.S. Provisional Application No. 62/178,587 filed on Apr. 15, 2015, the entire contents of which is herein incorporated by reference.

BACKGROUND

Electronic devices such as phones, computers, and/or tablets, among other electronic devices, can enable electronic communication between individuals. For example, inmates housed in penal institutions can use electronic communications to communicate with visitors. For instance, an electronic device can permit a visitor to interact with an inmate housed in penal institution while the visitor is at the penal institution and/or while the visitor is remotely located from the penal institution.

DETAILED DESCRIPTION

Figure 1:
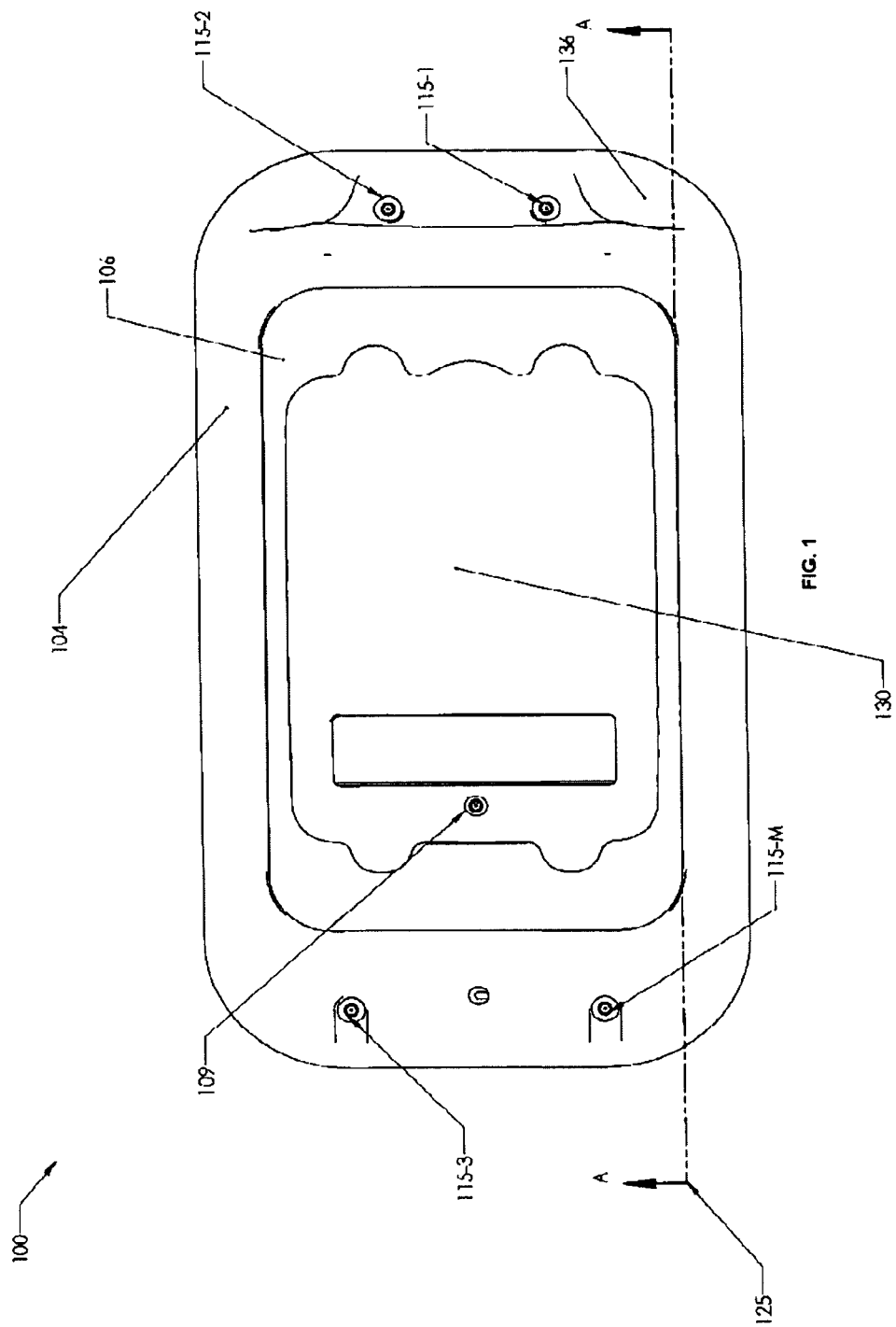
FIG. 1 illustrates an example of a secure electronic communication device according to the disclosure.

Communications between inmates and visitors are widely used by a variety of incarceration facilities. Incarceration facilities refer to a location housing inmates. Examples of incarceration facilities include prisons and/or jails, among other types of incarceration facilities. An inmate refers to an incarcerated person, for instance, those in an incarceration facility. An incarceration facility such as a prison may allow electronic communication between an inmate of the prison and a visitor. A used herein, a visitor refers to a family member, significant other, friend, and/or legal representative of an inmate, among other visitors that may communicate electronically with an inmate.

Electronic communication devices such as phones, computers, and/or tablets, among other electronic communication devices, can enable inmates housed in incarceration facilities to communicate electronically with visitors. Examples of electronic communications include electronic voice communications (i.e., an audio call), electronic video communications (i.e., a video call), and/or electronic text based communications (e.g., texting, etc.) with visitors, among other electronic communications.

An electronic communication device can permit a visitor to communicate with an inmate housed in an incarceration facility while the visitor is at the incarceration facility and/or while the visitor is remotely located from the incarceration facility. However, electronic communication devices may include externally accessible cavities such a port and/or an opening in an external housing of the electronic communication device. Such externally accessible cavities may allow for undesired storage of materials such as contraband and/or provide potential avenues by which an inmate may damage the electronic communication device.

Some electronic communication devices may include a handset (e.g., a telephone handset) and/or a cable that couples the handset to the electronic communication device to permit communications via the handset. However, such handset and/or cable configurations may be used in an undesirable manner by an inmate or other individual. For example, a handset and/or a cable may be used by an inmate to damage the electronic communication device and/or cause physically injury to the inmate or other individual.

Accordingly, examples of the disclosure are directed to secure electronic communication devices. Secure electronic communication devices can, for example, include a baseplate, a base coupled to the baseplate, a housing disposed at least partially within a volume defined by the base, where the housing includes at least a portion of a cavity to securely house an electronic communication device, and a housing coupling member that couples the housing to the base. In various examples, secure electronic communication device can include a housing coupling member that rotatably couples the housing to the base.

Advantageously, secure electronic communication devices can securely house an electronic communication device while permitting electronic communications (e.g., between an inmate and a visitor). As used herein, securely housing refers to permitting physical access to an electronic communication device sufficient to use the electronic communication device for electronic communications (e.g., electronic communication via an application of the electronic communication), while blocking physical access to at least a portion of the electronic communication device. For instance, an inmate or other individual can be permitted to access to some (e.g., permitting access via an opening in a faceplate) but not all of an area of a graphical user interface (GUI) of an electronic communication device disposed in a secure electronic communication device. Similarly, an inmate or other individual can be permitted physical access to a button disposed on an external housing of an electronic communication device (e.g., a home button) but not permitted access to other portions of an external housing of the electronic communication device due to a base, a housing, and/or a faceplate physically obstructing access to areas of the electronic communication device disposed in the secure electronic communication device. Moreover, secure electronic communications devices utilizing a handset, integral handset receiver, and/or cable, as described herein, can mitigate and/or prevent potential damage to an electronic communication device disposed in the secure electronic communication device and/or physically injury to an inmate or other individual.

FIG. 1 illustrates an example of a secure electronic communication device 100 according to the disclosure. As illustrated in FIG. 1, the secure electronic communication device 100 can include a base 104, housing 106, a faceplate 130 and a home key access 109, among other components including those described herein. Notably, a secure electronic communication device can be formed without an electronic communication device. Stated differently, in at least some examples, a secure electronic communication device can be configured to receive an electronic communication but do not include an electronic communication device.

The base 104 and the housing 106 can together form at least a portion of an external housing of the secure electronic communication device 100. The base refers to a fixed structure that can provide support for the housing 106 of the secure electronic communication device 100. As described herein, the base 104 can include a tensioner to impart force on and thereby support the housing 106. The base 104 and the housing 106 are designed with tolerances (e.g., a few microns or less) there between that mitigate and/or prevent an inmate or other individual from hiding contraband or other materials within an internal volume of the secure electronic communication device 100 formed by the base 104 and the housing 106 while desirably permitting movement of the housing 106 relative to the base 104. In various examples, when the base 104 is coupled to the housing 106 and the secure electronic communication device 100 is affixed to a surface, as described herein. Notably, when affixed to a surface the baseplate 102 is not visible and/or able to be physically contacted by an inmate or other individual due to the base 104 encompassing the baseplate 102.

The base 104 includes an integral handset receiver 136 to receive a handset. In this manner, a handset such as a telephone handset can be supported by the integral handset receiver 136. For example, a handset can be stored in the integral handset receiver 136 when not in use by an inmate or other individual.

Notably, in contrast to some handset receivers that include protruding, electrical, and/or movable components (e.g., metal prongs, electrical switches such as a "telephone hook" switch that may indicate when a telephone is "hung-up", etc.) the integral handset receiver 136 of the base 104 does not include protruding, electrical, and/or movable components. Rather, the integral handset receiver 136 is integral with and formed of a material of the base 104. For example, the integral handset receiver 136 can be formed at least in part of a fixed depression in a material of the base 104 that extends below a height of a surrounding exterior surface of the base 104. For instance, the integral handset receiver 136 can be formed of a depression shaped and sized to correspond to a particular type of handset (e.g., a telephone handset) so as to receive the handset at least partially within the integral handset receiver 136. For example, a depression can be sized to fit the handset partially within the depression so none of the handset protrudes out of the depression when the handset is placed in the depression. Desirably, the integral handset receiver 136, in contrast to those including protruding, electrical, and/or movable components, mitigates and/or eliminates a possibility of an inmate or other individual from injuring themselves or others on the integral handset receiver 136 and does not allow for storage of contraband or other materials in the integral handset receiver 136 and/or the secure electronic communication device 100.

For example, the integral handset receiver 136 formed of the depression in a material of the base 104 does not include a protruding component and has a comparatively low handset holding strength (as compared to handset receivers including a protruding, electrical, and/or moving component). As used herein, a handset holding strength refers to an amount of force that can be applied to a handset disposed in a handset receiver (e.g., the integral handset receiver) to remove the handset entirely from the handset receiver. For example, a handset holding strength of the integral handset receiver can be less than one pound, less than two pounds, less than three pounds and/or less than four pounds of force applied to the handset, among other possible values. In such an examples, an amount of force applied to the handset that is greater than a handset holding strength will result in the handset being displaced from the handset receiver.

Desirably, absence of a protruding component and the comparatively low handset holding strength can eliminate potential for a cable coupled to a handset to be wrapped around a protruding component (e.g., a telephone hook) and provide a comparatively more planar surface of the secure inmate communication device in contrast other devices with a protruding component to mitigate and/or prevent injury to an inmate or other individual on the protruding component itself and/or due to a handset and/or a cable being wrapped around the protruding component. For example, the absence of a protruding component and the comparatively low handset holding strength can prohibit an inmate or other individual from wrapping a cable of a handset around a body part while the handset is in the receiver and using the configuration to impart an amount of force on the body part sufficient to injury or kill (e.g., through strangulation by the configuration) the inmate or the other individual.

As shown in FIG. 1, the external housing of the secure electronic communication device 100 has a profile with rounded edges and corners. Additionally, it is noted that the external housing of the secure electronic communication device does not include any protruding components. As such, the external housing of the secure electronic communication device 100, in contrast to those with a protruding component (i.e., protruding above and/or away from the external housing) and/or without rounded edges and/or corners, can mitigate and/or prevent injuries to an inmate or other individual on the secure electronic communication device 100.

The base 104 can be coupled to a baseplate (not shown in FIG. 1 for ease of illustration). For instance, the base 104 can be coupled to the baseplate via a baseplate coupling member 115. Baseplate coupling member 115 can be formed of a screw (e.g., a hexhead screw) or other suitable mechanical fastener to couple base 104 to the baseplate. As illustrated in FIG. 1, the baseplate coupling member 115 can be formed of four baseplate coupling members 115-1, 115-2, 115-3, . . . , 115-M. At least some of the baseplate coupling members 115-1, . . . , 115-M are recessed within an exterior surface of the base 104. For instance, baseplate coupling members 115-1 and 115-2 can be recessed relative to a depression in a material of the base 104 forming the integral handset receiver 136 so as to not protrude into a volume of the integral handset receiver 136.

As illustrated in FIG. 1, each baseplate coupling member of the baseplate coupling members 115-1, . . . , 115-M, can be separate and distinct (e.g., formed of or including individual bolts, etc.). However, any suitable number and/or type of baseplate coupling members can be used to promote secure electronic communications devices such as those that can withstand attempts by inmates or other individuals to remove the secure electronic communication device 100 from a structure (e.g., a wall) the secure electronic communication device 100 is coupled to. In some examples, each baseplate coupling member of the baseplate coupling members is formed of an identical size and/or type of fastener such as an identically sized hexhead screw to permit secure and efficient decoupling of the base from baseplate.

The base 104 and/or the housing 106 can be formed in part or as a whole of a material that is at least semi-transparent and/or impact resistant to promote secure electronic communication devices, as described herein. For instance, in various examples, both the base 104 and the housing 106 are formed entirely of a material that is at least semi-transparent to visible light. In this manner, an individual (e.g., a guard or other official) in an environment external to the secure electronic communications device 100 can look through the material of the base 104 and/or the housing 106 to view internal components of the secure electronic communication device 100 that would not be visible with an opaque material to ensure that the secure electronic communication device 100 is does not include contraband and/or other undesired materials disposed therein. Desirably, in such examples the internal components are readily viewable without any disassembly of constituent components (e.g., the base and/or housing, etc.) of the secure electronic communication device 100.

Examples of suitable materials that are at least semi-transparent and/or impact resistant include various polymers such as a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, nylon polymers, or a combination thereof, among other materials which can be used to make the base 104 and/or the housing 106.

Figure 2:
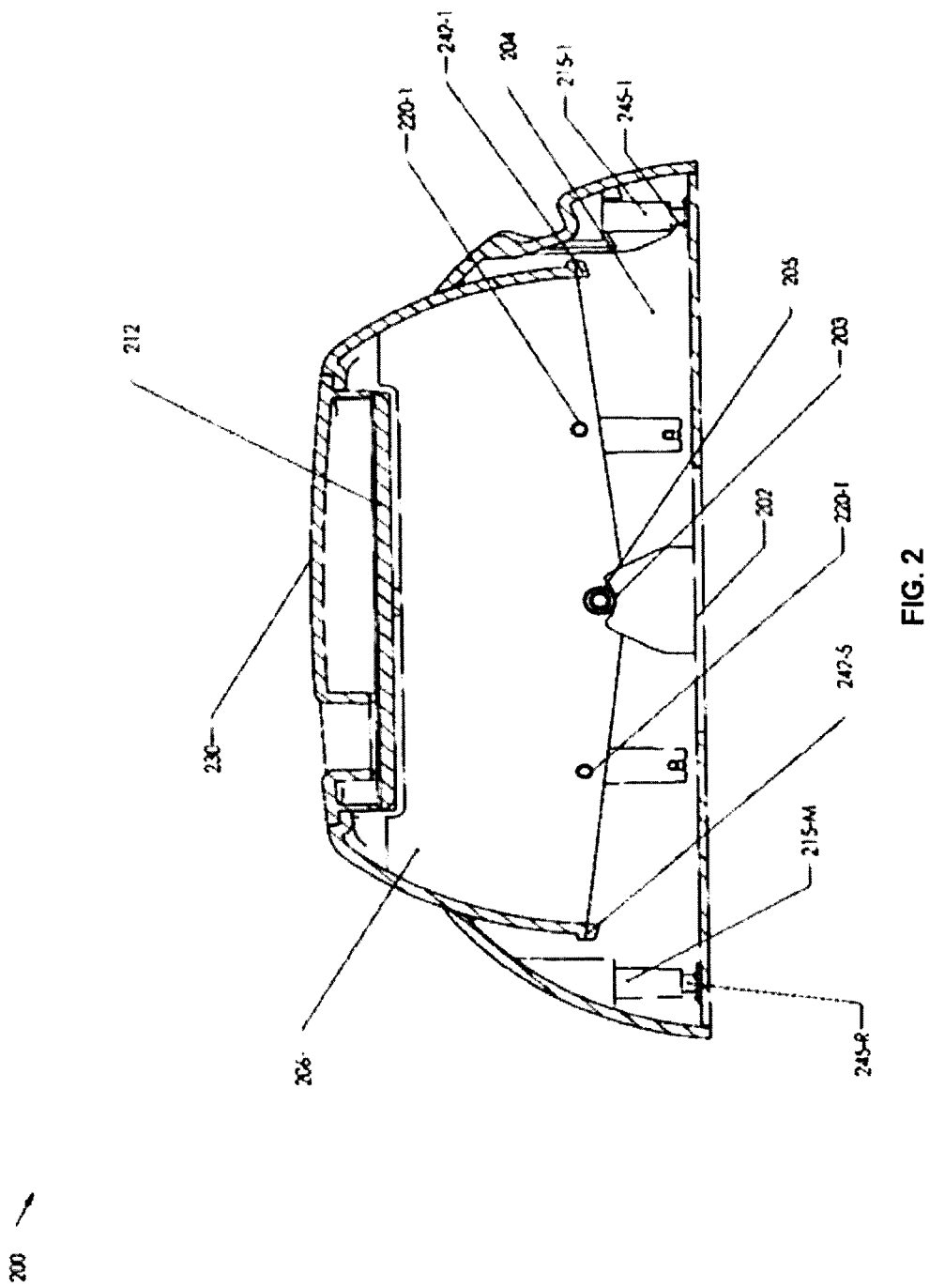
FIG. 2 illustrates a section view of an example of a secure electronic communication device according to the disclosure.

FIG. 2 illustrates a section view of an example of a secure electronic communication device 200 according to the disclosure. As illustrated in FIG. 2, the secure electronic communication device 200 includes a baseplate 202, a pivot 203, a base 204, a housing coupling member 205, a housing 206, a cavity 212, baseplate coupling members 215-1, ..., 215-M, receiving members 245-1, ..., 245-R, and tensioners 220-1, ..., 220-T.

The baseplate 202 can be formed of a material such as steel and/or a plastic material, among other materials depending upon a desired application of the secure electronic communication device, etc. In some examples, the baseplate 202 can be formed of a metal material such as steel and/or a plastic material such as a polycarbonate.

In some examples, the baseplate 202 can include a slot for attachment of a cable to the baseplate 202. A cable can, for example, refer to a metal cable such as a steel cable suitable to promote electronic communications via a handset coupled to the cable. For example, the cable can be coupled to a handset to promote voice, video, and/or text communications such as those described herein, along with other possible forms of communications. In some examples, the cable can be eighteen inches or less in total length to mitigate or eliminate an ability of an inmate or other individual to wrap the cable around a body part of the inmate or other individual.

The secure electronic communication device 100 can include a faceplate 130. As described herein, the faceplate 130 can permit assess to a GUI of the electronic communication device (not shown) when the electronic communication device is disposed securely within the secure electronic communication device 100. In some examples, the faceplate 130 can include a home key access 109 that can permit access to a home key of an electronic device.

As illustrated in FIG. 2, the baseplate 202 can include the pivot 203. In various examples, the pivot 203 is integral with and formed of a material that forms the baseplate 202. However, the disclosure is not so limited. Rather, pivot 203 can be a separate and distinct component that is coupled to the baseplate 202 using any suitable manner such as via a mechanical fastener, adhesive, etc.

The pivot 203 can promote rotatable coupling the base 204 to the housing 206. For example, pivot 203 can provide a fixed pivot point and/or semi-fixed pivot point about which rotation and/or translation can occur. For example, the pivot point 203 can be a fixed pivot point formed of a material that forms the baseplate 202. In such an example, the pivot point 203 and the baseplate can each be formed of steel or polycarbonate, among other possible materials.

In various examples, the housing coupling member 205 can be in contact with the pivot 203 to rotatably couple the housing 206 to the base 204. The housing coupling member 203 can be in contact with the pivot with an intervening component (such as a bearing, lubricant, or other component) or without an intervening component disposed between the pivot 203 and the housing coupling member 205. The housing coupling member 205 can extend through an opening, as describe herein, in the housing 206 to rotatably couple the housing 206 to the base 204.

The housing coupling member can comprise a pin extending through an opening in the housing 206 into a receiver included in the base 204 to rotatably couple the housing 206 to the base 204. The pin can be formed by a pivot screw, among other possibilities. For examples, the housing 206 can, in various examples, by coupled to the base 204 by two pivot screws and two bushings (one bushing for each pivot screw), among other possibilities. While the housing 206 can be rotatably coupled to the base 204, the disclosure is not so limited. Rather depending upon a desired application, in some examples, base 204 can be non-rotatably coupled to the housing 206 in a variety of suitable manners.

The housing coupling member 205 can be formed of a material that the base 204 and/or the housing 206 are formed of; however, in some examples the housing coupling member can be formed of a different material than a material that the base 204 and/or the housing 206 are formed of. For instance, in various examples, each of the base 204 and the housing 206 can be formed of a polycarbonate, while the housing coupling member can be formed of a metal such as steel, among other possibilities.

As mentioned, the housing 206 includes as least a portion of a cavity 212 to securely house an electronic communication device (e.g., electronic communication device 110 as described with respect to FIG. 1). The cavity 212 can be secured via mechanical fasteners to hold an electronic communication device disposed in the cavity, as described herein.

The housing 206 can be movable relative to the base 204 due at least in part to being rotatably coupled to the base 204. For example, the housing 206 can move down and/or down, relatively to the base 204. Moving the orientation of the housing 206 relative to the base 204 can desirably permit alteration of a viewing angle of a GUI of an electronic communication device disposed at least partially within the cavity 212 of the housing 206. For instance, the housing 206 can be moved up and/or down relative to the base 204 to accommodate use of the secure electronic communication device 200 by inmates or other individuals of varying heights, positions (e.g., standing or sitting positions), and/or locations relative to the secure electronic communication device 200.

In some examples, an interface between the baseplate 202, the base 204, and/or the housing 206 can be reinforced with an additional material (e.g., a metal reinforcement) and/or be formed of a material that is comparatively thicker than the material that forms other portions of the baseplate 202, the base 204, and/or the housing 206. Such reinforcement can provide enhanced durability and/or ability to withstand physical attacks on the secure electronic communication device 200. Further, the housing 206 can be reinforced in a manner suitable to provide such reinforcement along with grooves such as those described herein with respect to FIG. 4.

The baseplate coupling members 215-1, . . . , 215-M can act as guides to promote coupling of the baseplate and the base and/or promote coupling of the baseplate to a surface such as a wall. The baseplate coupling members 215-1, . . . , 215-M can be coupled to the receiving members 245-1, . . . , 245-R to couple the base 204 to the baseplate 202. For example, each baseplate coupling member of the baseplate coupling members 215-1, . . . , 215-M can include or be formed of a mechanical fastener such as a screw, bolt, etc. that can be inserted into a corresponding receiving member of the receiving members 245-1, . . . , 245-R to couple the base 204 to the baseplate 202.

As illustrated in FIG. 2 and described herein, housing 206 can be disposed at least partially within a volume defined by base 204. In various examples, the housing 206 includes at least a portion of a cavity 212 to securely house an electronic communication device (not shown in FIG. 2 for ease of illustration).

The tensioners 220-1, . . . , 220-T can be positioned in various locations to place the housing 206 and/or the base 204 in tension. In this manner, a speed of rotation (e.g., rotation of the housing when being tilted vertically up or down) of the housing 206 as a result of a force applied to the housing 206 is reduced as compared to a speed of rotation of a housing that does not employ tensioners. For example, the tensioners 220-1, . . . 220-T can be positioned with a volume of the housing 206 and/or the base 204 to impart a force disposing the housing 206 against the base 204, as described herein.

Figure 3:
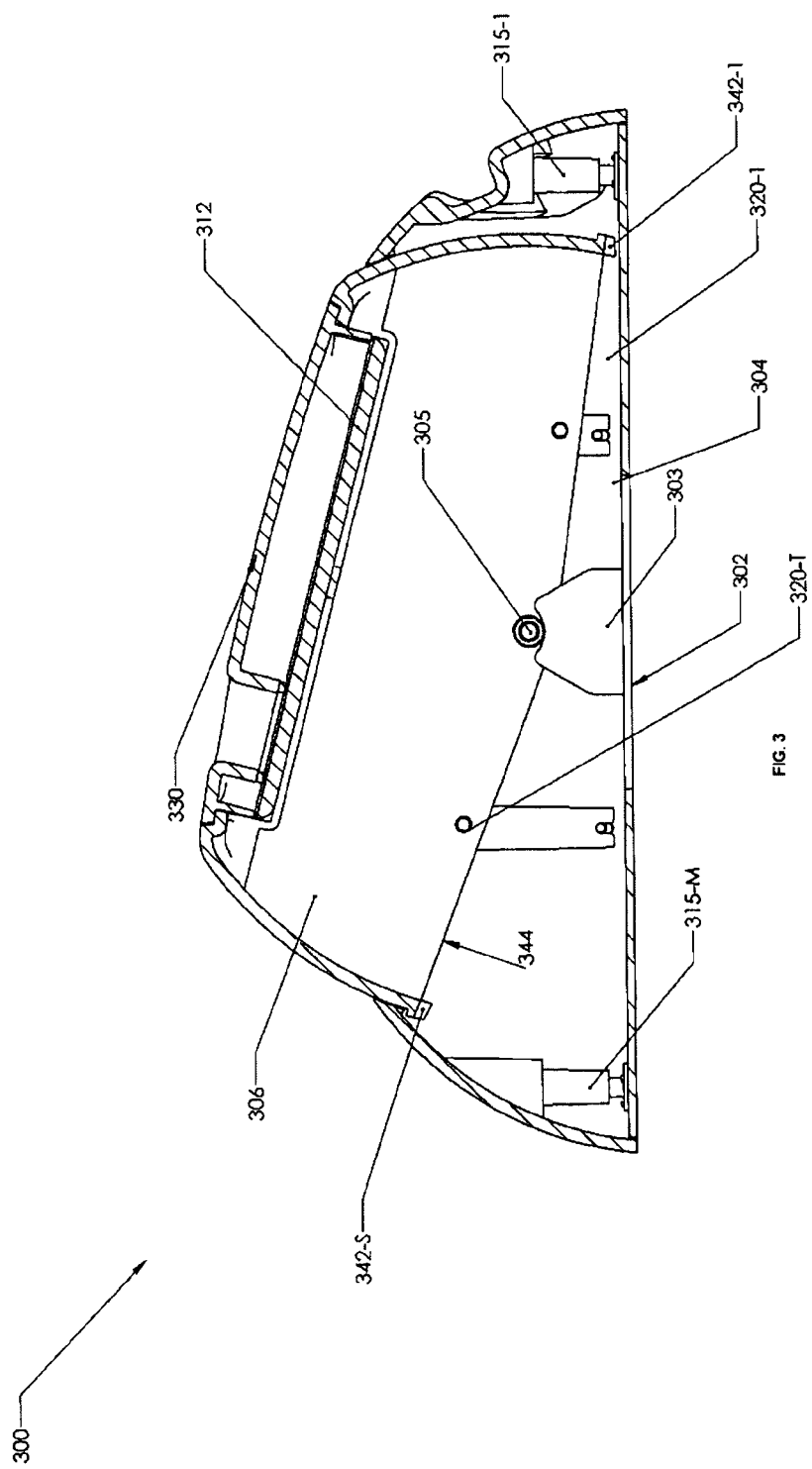
FIG. 3 illustrates a section view of an example of a secure electronic communication device according to the disclosure.

FIG. 3 illustrates a section view of an example of a secure electronic communication device 300 according to the disclosure. As illustrated in FIG. 3, the secure electronic communication device 300 can include a baseplate 302, a pivot 303, a base 304, a housing coupling member 305, a housing 306, a cavity 312, baseplate coupling members 315-1, . . . 315-M, and tensioners 320-1, . . . , 320-T.

As mentioned, the housing 306 can be rotatably coupled to the base 304. For example, the housing 306 can be rotatable along an axis of rotation 344 relative to the baseplate 302 and/or the base 304. For instance, the housing can be moved relative to the baseplate 302 and the base 304 as illustrated in FIG. 3 along an axis of rotation 344. Put another way, the housing 306 can be moved up and/or down to accommodate use of the secure electronic communication device 300 by individuals of varying heights, among other possibilities.

The housing 306 can be moved along the axis of rotation 344 prior to, during, and/or following an electronic communication. In some examples, the axis of rotation 344 can permit rotation of the housing by up to thirty degrees of rotation. For example, relative to a starting position (e.g., zero degrees of rotation) the housing can be rotated up fifteen degrees or down fifteen degrees to form 30 degrees of permitted rotation along the axis of rotation, among other possibilities. For instance, in some examples, the axis of rotation 344 can permit rotation of the housing by up to twenty-five degrees, where the housing can be rotated up ten degrees and/or down fifteen degrees. However, the disclosure is not so limited. Rather, any suitable non-zero amount of amount of rotation can be permitted along the axis of rotation 344 to promote aspects of secure electronic communication devices. The axis of rotation 344, as illustrated, can extend from a rotation of the housing 306 such that the housing 306 and/or a first travel stop contacts the baseplate 302 to rotation of the housing 306 such that the housing 306 and/or a second travel stop contacts the baseplate 302.

In some examples, the secure electronic communication device can include a housing travel stop 342 to limit a degree of rotation of the housing along the axis of rotation 344. For example, as illustrated in FIG. 3 the housing 306 can include a plurality of travels stops 342-1, . . . , 342-S. The travels stops can be positioned on the housing to contact the baseplate 302 at a maximum degree of rotation along the axis of rotation 344 such that rotation up or down by a maximum degree of rotation results in a corresponding travel stop impacting the baseplate 302. While travel stops 342-1, . . . , 342-S are positioned along a 'top' of the housing 306, the housing can include travel stops (not shown for ease of illustration in FIG. 3) positioned along a 'bottom' of the housing. Travel stops 342-1, . . . , 342-S can be formed of a material of the housing 306 and/or can be formed of another material such as rubber, various plastics, etc.

Figure 4:
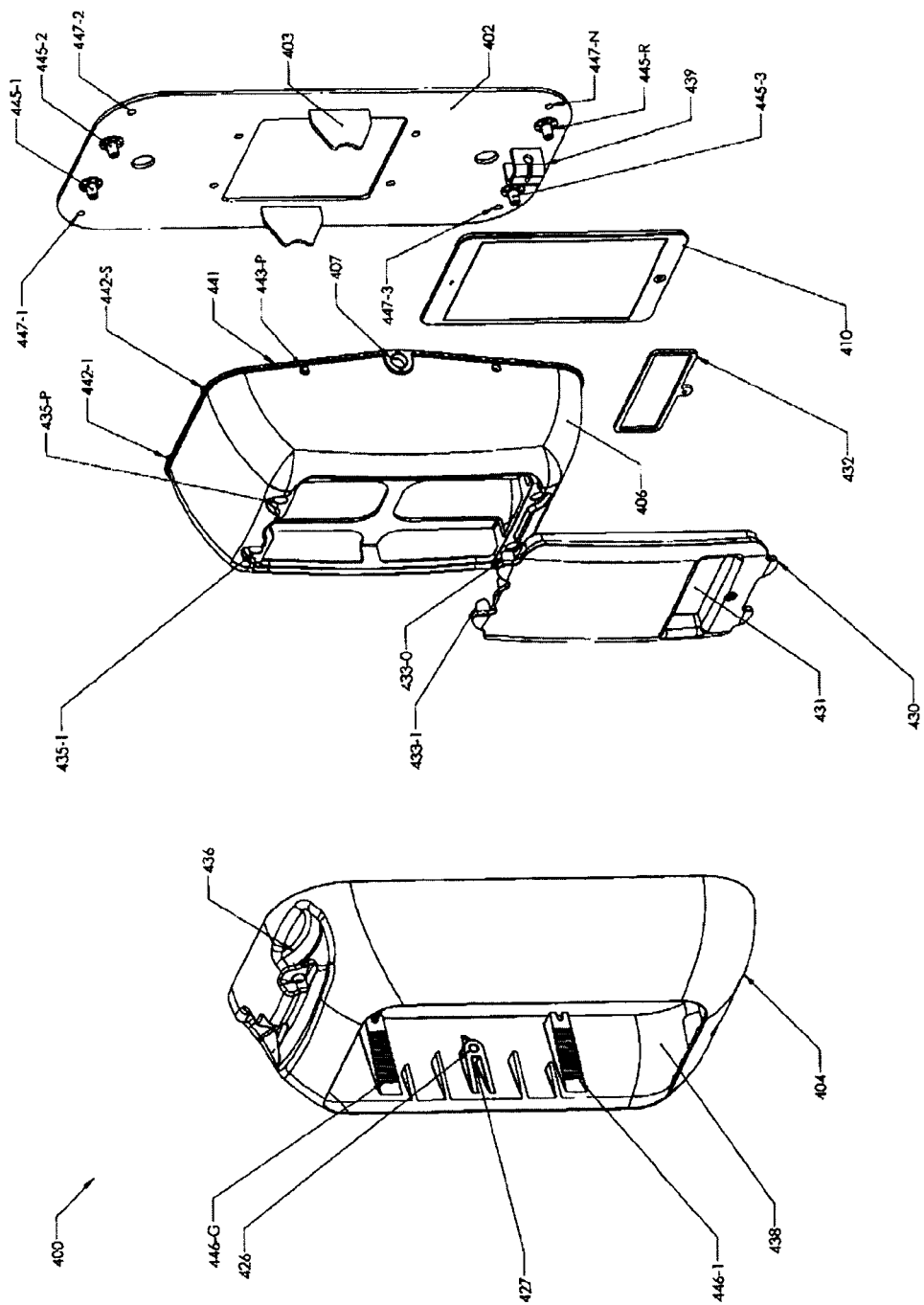
FIG. 4 illustrates an exploded view of an example of a secure electronic communication device according to the disclosure.

FIG. 4 illustrates an exploded view of an example of a secure electronic communication device 400 according to the disclosure. As illustrated in FIG. 4, the secure electronic communication device can include a base 404, a housing 406, a faceplate 430, a gasket 432, an electronic communication device 410, and a baseplate 402.

The base 404 can include an integral handset receiver 436. The base can include an opening 438. The opening 430 can be sized to permit the housing to be disposed in the base and permit electronic communications via the electronic communication device 410 disposed within a cavity formed at least in part by the housing 406 when disposed in the base 404. In various examples, the opening 430 can permit a cable to pass through the opening 430 to the baseplate 402, as described herein.

The base 404 can include a plurality grooves 446-1, . . . , 446-G forming predetermined set points of rotation positioned along an axis of rotation of the housing 406. That is, an interface between the housing 406 and a groove of the plurality of grooves can result in comparatively increased friction to disposition the housing 406 within a groove of the plurality of grooves. In this manner, the housing can be readily adjustable to a variety of possible viewing positions corresponding to each groove of the plurality of grooves 446-1, . . . , 446-G rather than simply allowing for unhindered rotation of the housing along the axis of rotation.

Put another way, in some examples, a portion of the housing 406 and/or another component such as a spring plunger 443-P can contact a respective groove of the plurality of grooves 446-1, . . . , 446-G when the portion of the housing is disposed adjacent to the respective groove such that the housing 406 is temporarily fixed (until further rotation of the housing to a different groove the housing) in a viewing position corresponding the respective groove. A user such as an inmate or other individual using the secure electronic communication device 400 can vary viewing angle of the electronic communication device 410 by imparting a force on the housing 406 sufficient to cause rotation of the housing along an axis of rotation of the housing 406. The portion of the housing that is in contact with the respective groove may be an edge of the housing such as edge 441 and/or a projection such as a spring plunger 443-P on the housing 406.

For instance, the edge 441 of the housing 406 can contact a first respective groove of the plurality of grooves 446-1 and a second respective groove of the plurality of grooves 446-G to temporarily fix (until further rotation of the housing) the housing 406 in a viewing position. In some examples, a spring plunger 443-P can be included in the housing and contact a first respective groove of the plurality of grooves 446-1 and another spring plunger can contact a second respective groove of the plurality of grooves 446-G to temporarily fix the housing 406 in a viewing position. While FIG. 4 illustrates a particular number and location of the plurality of grooves 446-1, . . . , 446-G, a total number of and/or a location of the grooves can be varied. In various examples, the base 404 can include a plurality of grooves at four distinct locations within the base 404 to interact with four distinct projections such as four distinct spring plungers included in the housing. So, while FIG. 4 illustrates two distinct sets of a plurality of grooves, the base can include two additional sets of a plurality of grooves on an internal surface of the base 404 opposite from the grooves illustrated at in FIG. 4.

The base 404 can include a receiver 426. As illustrated in FIG. 4, the receiver can include an opening 427 to rotatably couple the housing 406 to the base 404. For example, a housing coupling members can include a pin (not shown) that can extend through an opening 407 in the housing 406 into an opening in a corresponding receiver (not shown) such that the pin is disposed against the corresponding receiver, a surface of the opening 407, and/or a surface of the pivot 403 to rotatably couple the housing 406 to the base 404.

The faceplate can include an opening 431 and mounting points 433-1, . . . 433-O. The opening 431 can permit access (e.g., by an inmate or other individual) to a portion of a GUI of the electronic communication device 410. That is, the opening 438 in the base 404 and the opening 431 in the faceplate 430 can permit assess to a GUI of the electronic communication device 410 when disposed securely within the secure electronic communication device 400. In this manner, the electronic communication device can be used for various electronic communications while being securely housed in the secure electronic communications device 400.

A faceplate coupling member along with the mounting points 433-1, . . . , 433-O can couple the faceplate 430 to the housing 406. The housing can include corresponding mounting points 435-1, . . . , 435-P that correspond to the mounting points 433-, . . . 433-O and promote coupling of the faceplate 430 to the housing 406. For example, mechanical fasteners (not shown) such as screws, bolts, etc. can pass through the mounting points 433-1, . . . 433-O and the corresponding mounting points 435-1, . . . , 435-P to couple the faceplate 430 to the housing 406, among other possibilities. The housing can include travels stops 442-1, . . . , 442-S, as described herein.

The gasket 432 can be positioned entirely around a periphery of the opening 431 to seal a portion of the electronic communication device 410 from an environment external to the secure electronic communication device 400. The gasket 432 can be formed of rubber, plastic, and/or various other suitable materials to seal a portion of the electronic communication device from liquids and/or other materials.

The baseplate 402 can include a pivot 403. The baseplate can include can include a slot 439 for attachment of a cable to the baseplate 402, as described herein. As mentioned, the base can include receiving members 445-1, . . . , 445-R to facilitate coupling of the base 404 to the baseplate 402.

In various examples, baseplate 402 can be coupled to a wall (e.g., to provide a fixed location of the secure electronic communication device 400), a portable stand (e.g., to provide a movable location of the secure electronic communication device 400), and/or another structure. For instance, the baseplate 402 can be coupled to a wall via mechanical coupling members such as screws and/or bolts, etc. that pass through openings 447-1, 447-2, 447-3, . . . , 447-N to the wall, among other possibilities.

Figure 5:
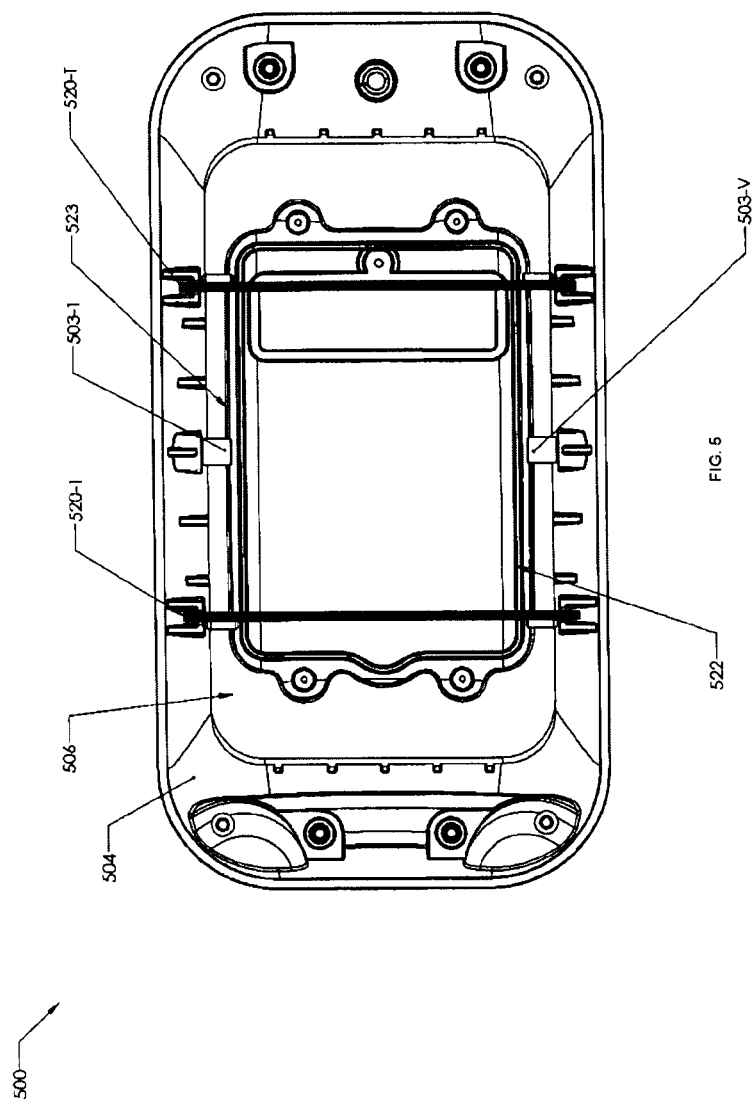
FIG. 5 illustrates a profile view of an example of a secure electronic communication device according to the disclosure.

FIG. 5 illustrates a profile view of an example of a secure electronic communication device 500 according to the disclosure. The profile view of the secure electronic communication device 500 is taken from a view of the secure electronic communication device opposite the view of the secure electronic communication device of FIG. 1. The secure electronic communication device of FIG. 5 does not include an electronic communication device. A baseplate of the secure electronic communication device is not illustrated in FIG. 5 such that other elements are readily viewable.

As illustrated in FIG. 5, the secure electronic communication device 500 can include a pivot 503 such as pivots 503-1, . . . , 503-T and a tensioner such as tensioners 520-1, . . . , 520-T. In various examples, the tensioner can impart tension along an interface 523 between a base 504 and a housing 506 of the secure electronic communication device 500. In this manner, the base 504 and the housing 506 can be dispositioned together due at least in part to a force imparted by the tensioner. For example, the tensioners 520-1, . . . , 520-T can impart force at four locations along the interface 523 between the base 504 and the housing 506. While illustrated as including two tensioners and two pivots at particular locations, a total number of and/or a location of the tensioner and/or the pivots can be varied. In some examples, the secure electronic communication device can be formed without a tensioner and/or without a pivot.

An amount of force imparted by a tensioner of the tensioners 520-1, . . . , 520-T can be varied and/or a type of tensioner can be varied depending upon an application. For instance, in some examples, a tensioner can be adjustable to vary an amount of the force disposing the housing 506 against the base 504. For example, a tensioner can be formed of and/or include a threaded rod and nut combination where the position of the nut along the threaded rod can be varied to adjust (increase or decrease) an amount of force disposing the housing 506 against the base 504, among other possible types of tensioners and/or mechanisms to vary a force imparted by a tensioner.

Figure 6:
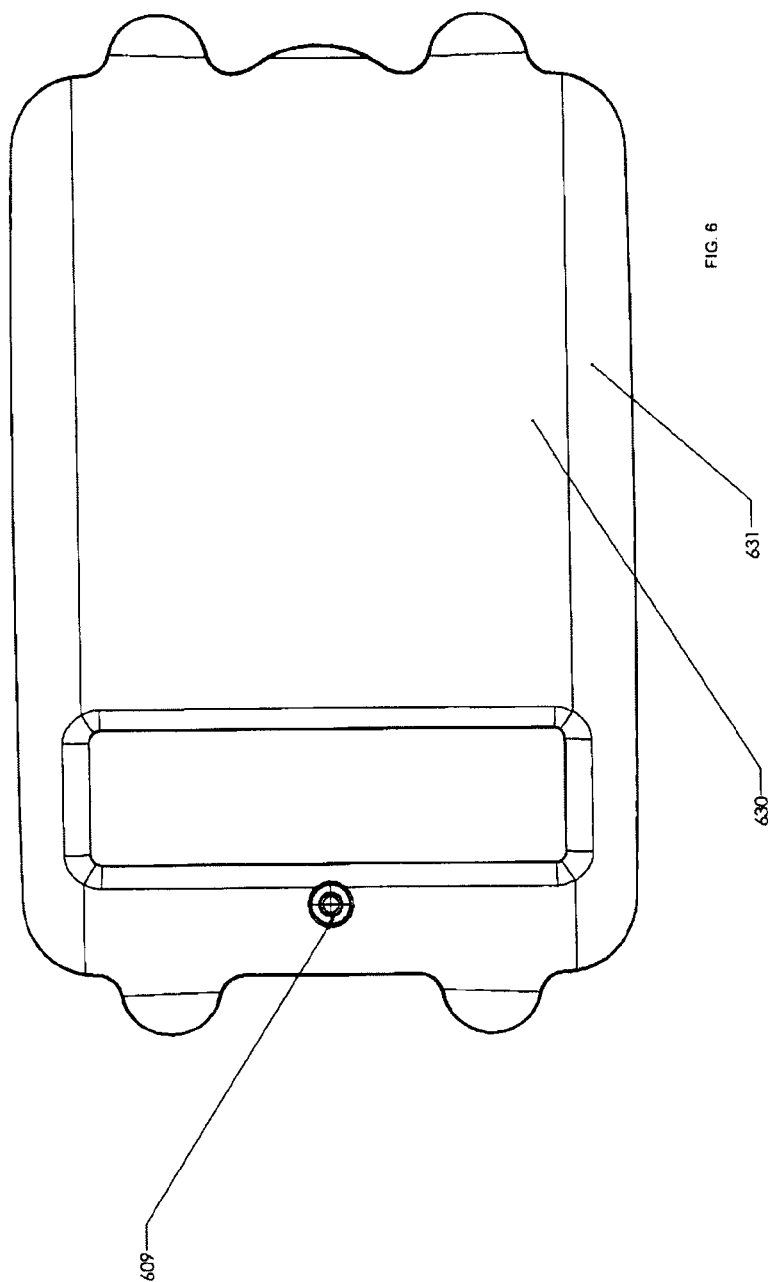
FIG. 6 illustrates a view of an example of faceplate suitable with a secure electronic communication device according to the disclosure.

FIG. 6 illustrates a view of an example of a faceplate 630 suitable with a secure electronic communication device according to the disclosure. As illustrated, the faceplate can be formed of a continuous material with an opening 631 included in the faceplate 630. The faceplate 630 can be formed of a various material such as a plastic and/or a metal, among other possible materials. In various examples, the faceplate 630 can be formed of polycarbonate. For instance, the faceplate 630 can be formed entirely of polycarbonate. The faceplate 630 can be formed of a material such as polycarbonate that is at least semi-transparent. However, in some examples, the faceplate can be formed of an opaque material that visually obscures a portion of a GUI of an electronic communication device.

In various examples, the faceplate 630 can permit access to a home key of an electronic communication device. For example, the faceplate can include a home key access 609 formed of an opening permitting direct access to a home key of the electronic communication device disposed behind the faceplate 630 or can include a material that is movable (e.g., a movable membrane formed of rubber, plastic, and/or other suitable material) to indirectly contact a home key of the electronic communication device. For example, such membrane can deform or otherwise move in response to physically contact by an individual so the individual can indirectly interact with a home key and realize functionality of the electronic communication device associated with the home key.

The faceplate 630 can be positioned between an environment external to the secure electronic communication device and a GUI of an electronic communication device to obstruct access to a portion of the GUI. The faceplate 630 can be interchangeable. For instance, various faceplates having openings of different respective sizes can be utilized in the secure electronic communication device depending upon a desired application of the secure electronic communication device. For example, in a high-security application a faceplate with a relatively small opening can be utilized in the secure electronic communication device to permit access to a comparatively small area of the GUI of the electronic communication device, while in a low security application a faceplate with a relatively large opening can be utilized in the secure electronic communication device to permit access to a comparatively large area of a GUI of the electronic communication device.

In some examples such as high security applications a diameter of the opening 631 is comparatively less than a dimension of a handset (e.g., less than a smallest dimension of a three-dimensional handset) coupled to the secure electronic communication device. In this manner, the handset cannot pass through the opening and/or into a GUI behind the opening 631 so as to protect the GUI from impact by the handset. In any case, an inmate of other individual can access a portion of the GUI of an electronic communication device to realize functionality of the electronic communication device associated with the portion of the GUI. For instance, a user can interact with the GUI with an application of the electronic communication device that promotes electronic communications, among other possibilities.

Figure 7:
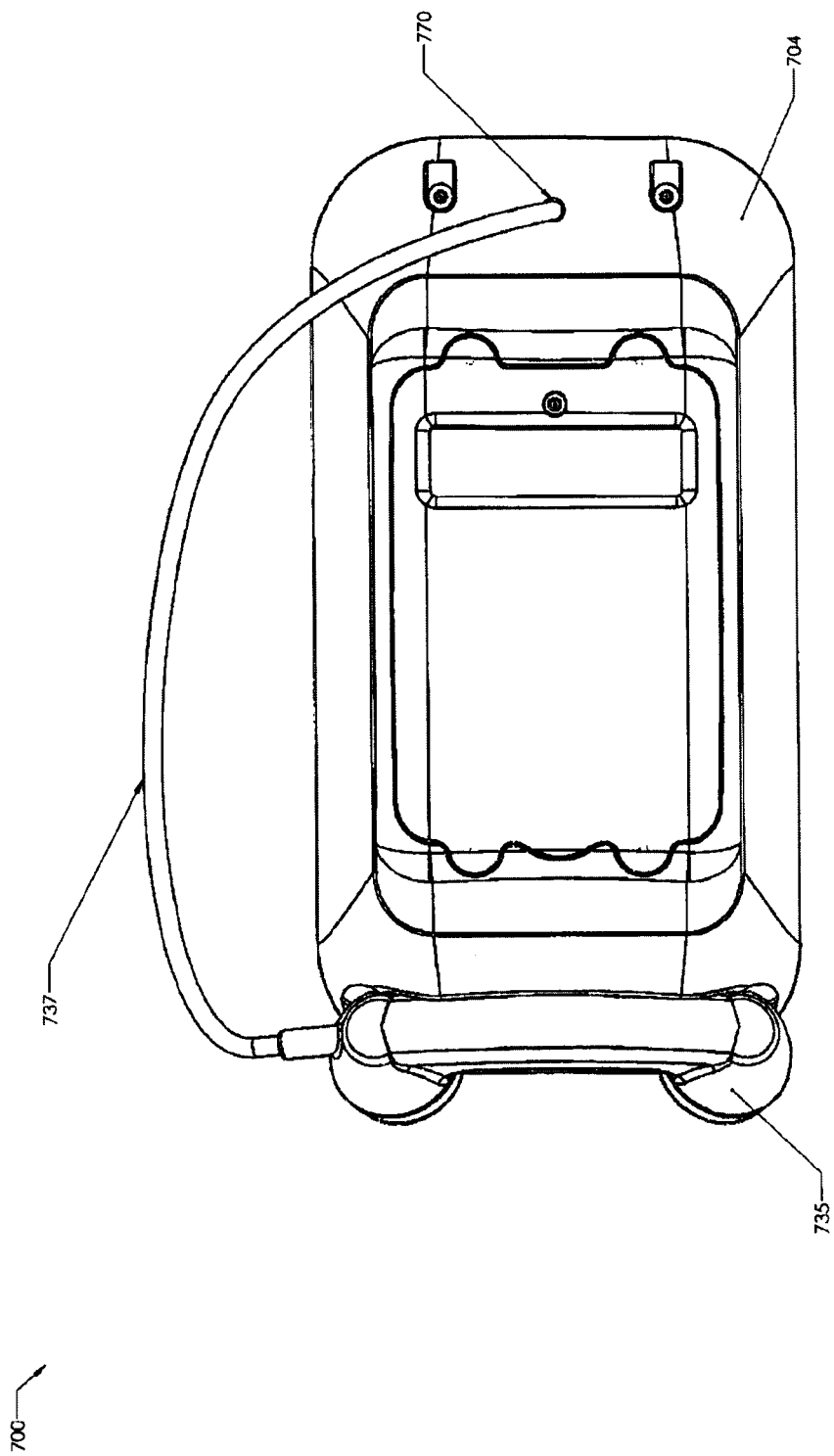
FIG. 7 illustrates an example of a secure electronic communication device including an example of a handset and an example of a cable according to the disclosure.

FIG. 7 illustrates an example of a secure electronic communication device 700 including an example of a handset 735 and an example of a cable 737 according to the disclosure. As illustrated in FIG. 7, the handset 735 is coupled to the cable 737. In some examples, the handset can be directly coupled to the cable 737. As detailed herein with respect to FIG. 9, the cable 737 is coupled to the secure electronic communication device 700 via an opening 770 in the base 704. The cable 737, as mentioned can be a metal cable such as a steel cable suitable to promote electronic communications via the handset 735 coupled to the cable. The handset 735, as mentioned can be a telephone handset as is illustrated in FIG. 7.

Figure 8:
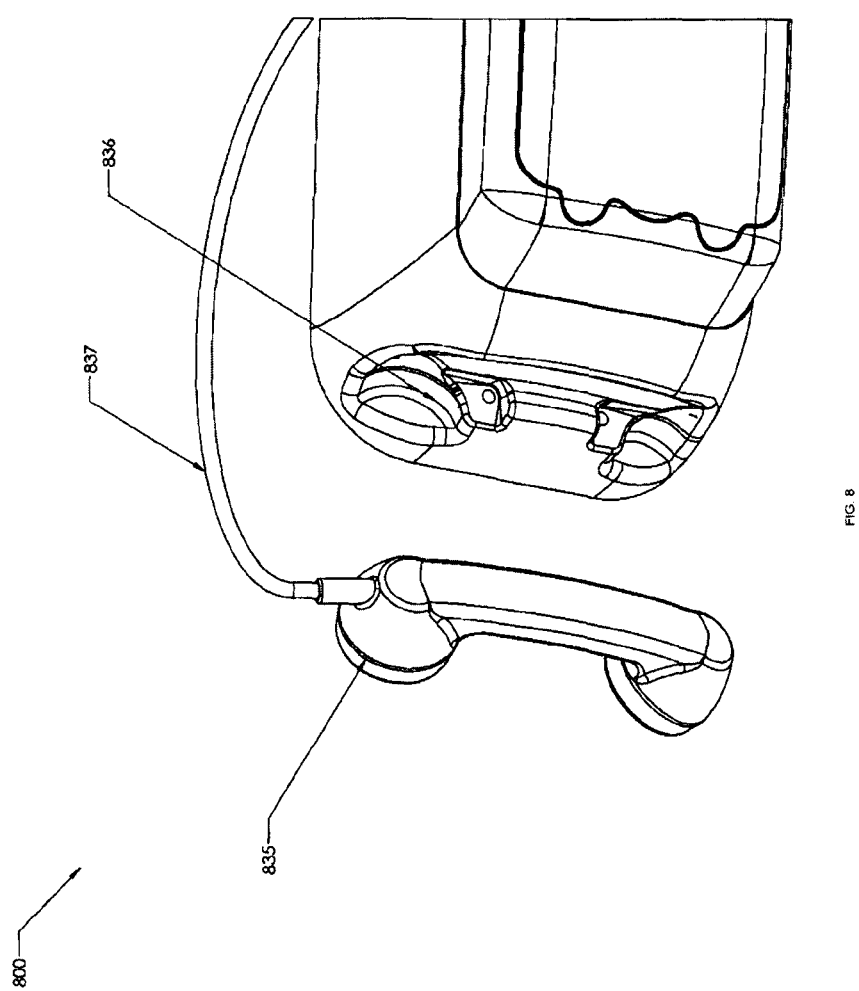
FIG. 8 illustrates an example of an enlarged view of a portion of the secure electronic communication device of FIG. 7.

FIG. 8 illustrates an example of an enlarged view of a portion of the example of the secure electronic communication device of FIG. 7. As illustrated in FIG. 8, the secure electronic communication device includes a handset 835 coupled to a cable. As illustrated, the handset 835 is removable from the integral handset receiver 836. For example, an inmate or other individual using the secure electronic communication device 800 can remove the handset 835 from the integral handset receiver 836 to promote the handset to receive and/or transmit audio during an electronic communication and can place the handset 835 into the integral handset receiver 836 upon conclusion of the electronic communication.

Notably, an in-progress electronic communication such as a video call can, in some examples, be continued in response to placing the handset 835 into the integral handset receiver 836. That is, in contrast to other handset receivers, placing the handset 835 into the integral handset receiver 836 does not inherently end an on-going electronic communication. Rather, further communication (e.g., video and/or voice) communication may be facilitated by the secure electronic communication device via audio and/or video receiving capabilities of an electronic communication device such as a tablet disposed in the secure electronic communication device 800. For example, a communication can continue until an 'end' button or similar element displayed in a GUI of the electronic communication device is selected.

As mentioned, in contrast to some handset receivers that include protruding, electrical, and/or movable components (e.g., metal prongs and/or electrical switches such as a "telephone hook" switch that may indicate when a telephone is "hung-up", etc.) the integral handset receiver 836 does not include protruding, electrical, and/or movable members. As mentioned, the integral handset receiver 836 is formed at least in part of a fixed depression in a material of the base that extends into the base 804 (i.e., the depression extending below a height of a surrounding exterior surface of the base 804 adjacent to the depression). As mentioned, the depression can be sized such that at least a portion of a handset can reside within the depression (i.e., below a height of a surrounding exterior surface of the base 804 adjacent to the depression).

Figure 9:
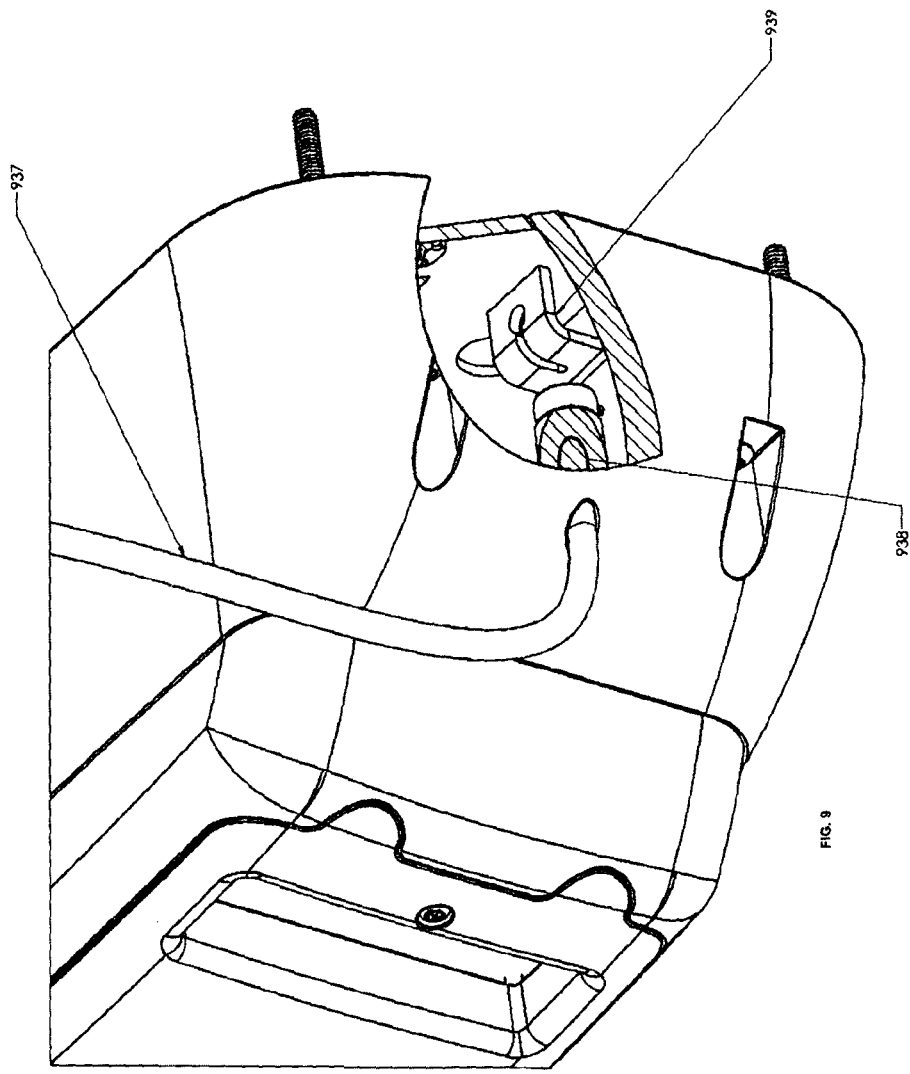
FIG. 9 illustrates an example of an enlarged view of a portion of the secure electronic communication device of FIG. 7.

FIG. 9 illustrates an example of an enlarged view of a portion of the example of the secure electronic communication device of FIG. 7. As illustrated in FIG. 9, an end of the cable 937 can be attached to a slot 939. For example, the end of the cable 937 can terminate in a handset having a circumference sufficient to friction fit with and/or not pass through the slot 939 when inserted into the slot 939. That is, while FIG. 9 illustrates the cable 937 outside of the slot 939 (i.e., not inserted into the slot 939) the cable 937 can be inserted into and remain coupled to the slot 939. In various examples a grommet or other suitable mechanism of the cable 937 can be inserted into the slot 939 to couple the cable 937 to the baseplate.

Notably, due at least in part to the slot 939 for attachment of the cable 937 to the baseplate, the cable 937 can provide a reverse pulling strength sufficient to oppose at least 7561 newtons (at least 1700 pounds of force) of pulling force by an inmate or other individual (e.g., without the cable 937 detaching from the baseplate and without the baseplate detaching from a structure it is coupled to). As such, the secure electronic communication device including the cable and headset can withstand various activities and/or attacks by inmates or other individuals while continuing to function as intended (e.g., to permit electronic communications using the electronic communication device). That is, cable 937 includes an electrical conduit and/or a wire within an outer housing (e.g., steel sheath) of the cable 937 to promote electronic communication, for instance, by communicatively coupling a handset of the secure electronic communication device 900 to other electrical components of the secure electronic communication device 900 and/or an electronic device disposed in the secure electronic communication device 900.

Figure 10:
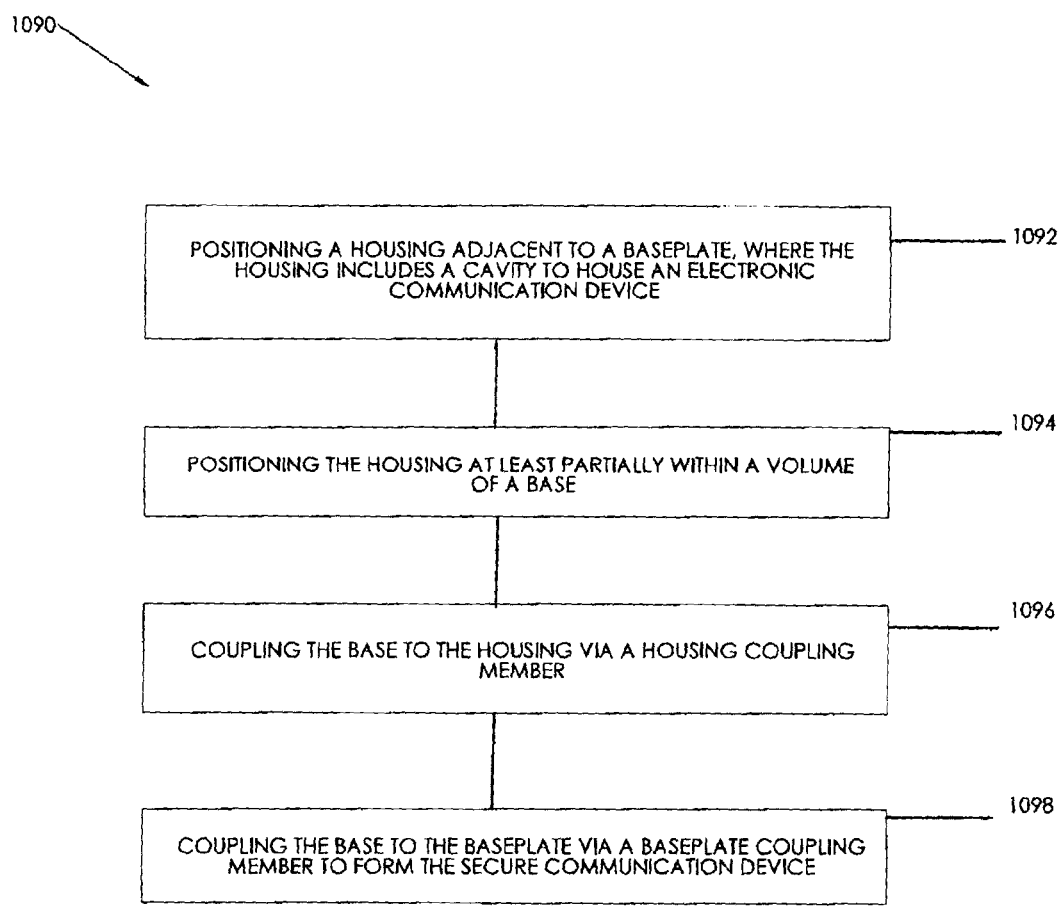
FIG. 10 illustrates a flow diagram of an example of a method of forming a secure electronic communication device according to the disclosure.

FIG. 10 illustrates a flow diagram of an example of a method 1090 of forming a secure electronic communication device according to the disclosure. As illustrated in FIG. 10 at 1092, the method 1090 can include positioning a housing adjacent to a baseplate. As used herein, being adjacent can refer an element (e.g., a housing) being in physical contact with another element (e.g., baseplate) and/or being arranged in a manner to promote other aspects of the method 490 (e.g., coupling the base to the housing). As used herein, positioning can include manufacture of and/or otherwise procuring a component (e.g., procuring a housing) and/or providing a component to a particular location and/or orientation relative another component to promote aspects of the method 490. As mentioned, the housing includes a cavity to house an electronic communication device.

In various examples, the method 1090 can include positioning the housing at least partially within a volume of a base, as illustrated at 1094. The housing can extend partially outside a volume of the base (e.g., housing extending partially outside a volume of a base as illustrated in FIGS. 2 and 3).

As illustrated at 1096, the method 1090 can include coupling the base to the housing via a housing coupling member. As mentioned, the housing coupling member can be in contact with a pivot of a base to rotatably couple the housing to the base. For examples, a housing can, in various examples, by coupled to a base by two pivot screws and two bushings (one bushing for each pivot screw), among other possibilities.

The method 1090 can include coupling the base to the baseplate via a baseplate coupling member to form the secure electronic communication device, as illustrated at 1098. In some examples, the method 1090 can include disposing an electronic communication device within the cavity. The electronic communication device can be disposed within the cavity to house the electronic communication device with the secure electronic communication device. In this manner, the secure electronic communication device can securely house an electronic communication device while permitting electronic communications though use of the electronic communication device disposed in the cavity. For instance, physical access can be permitted via an opening in a faceplate, as described herein, to a portion of a GUI of the electronic communication device deposed in the cavity, but not permitting access to another portion of the electronic communication device. For example, an inmate or other individual may be unable to access portions of the electronic communication device other than those (e.g., a portion of the GUI and/or the home key access) permitted by an opening in a faceplate.

In some examples, the method 1090 can include rotating the housing to vary a viewing angle of an electronic communication device relative to a position of an inmate or other individual using the secure electronic communication device. For example, the housing can move down and/or up relatively to the base. As mentioned, moving the orientation of the housing relative to the base can desirably permit alteration of a viewing angle of a GUI of an electronic communication device disposed at least partially within the cavity of the housing.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 306 in FIG. 3.

In the detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

As will be appreciated, elements shown in the various examples herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. As used herein, "a number of" an element and/or feature can refer to a number of such elements and/or features. In addition, "for example" and similar phrasing is intended to mean, "by way of example and not by way of limitation". It is understood that when an element is referred to as being "on," "connected to", "coupled to", or "coupled with" another element, it can be directly on, connected to, or coupled with the other element or intervening elements may be present.

The specification examples provide a description of the applications and use of the system and method of the disclosure. Since many examples can be made without departing from the spirit and scope of the system and method of the disclosure, this specification sets forth some of the many possible example configurations and implementations.

What is claimed:

1. A secure electronic communication device, comprising:
a baseplate;
a base coupled to the baseplate;
a housing disposed at least partially within a volume defined by the base, wherein the housing includes at least a portion of a cavity to house an electronic communication device;
a housing coupling member that rotatably couples the housing to the base; and
an integral handset receiver formed of a depression in a material of the base to receive a handset.

2. The device of claim 1, including a tensioner to impart a force disposing the housing against the base, and wherein the tensioner is adjustable to vary an amount of the force disposing the housing against the base.

3. The device of claim 1, wherein a handset holding strength of the integral handset receiver is less than four pounds of force.

4. The device of claim 3, wherein the integral handset receiver does not include an electrical component.

5. The device of claim 3, wherein the handset is coupled by a cable to the baseplate to transfer a force on the handset to the baseplate.

6. The device of claim 1, wherein the housing is rotatable along an axis of rotation relative to the base, and wherein the housing includes a travel stop to limit a degree of rotation of the housing along the axis of rotation.

7. The device of claim 6, wherein the base includes a plurality grooves forming predetermined set points of rotation positioned along the axis of rotation, and wherein a portion of a spring plunger included in the housing is to contact a respective groove of the plurality of grooves when the spring plunger is disposed adjacent to the respective groove.

8. The device of claim 1, including a faceplate, and further including an electronic communication device disposed in the cavity, wherein a portion of a graphical user interface of the electronic communication device disposed in the cavity is accessible via an opening in the faceplate.

9. The device of claim 1, wherein the base and the housing are formed of a material that is at least semi-transparent to permit at least partial visibility into the secure electronic communication device.

10. A secure electronic communication system, comprising:
   a secure electronic communication device including:
      a baseplate including a pivot;
      a base coupled to the baseplate;
      a housing at least partially disposed within the base, wherein the housing includes a cavity; and
      a housing coupling member in contact with the pivot and extending through an opening in the housing into a receiver in the base to rotatably couple the housing to the base; and
   an electronic communication device disposed within the cavity of the housing.

11. The system of claim 10, wherein the housing is to rotate at least 30 degrees along an axis of rotation relative to the baseplate.

12. The system of claim 10, wherein the base and the housing together form at least a portion of an external housing of the secure electronic communication device to securely house the electronic communication device disposed within the cavity of the housing, and wherein the external housing of the secure electronic communication device has rounded edges and corners formed by the base and the housing.

13. The device of claim 12, wherein the electronic communication device is a tablet, and wherein an opening in the base permits access to a home button of the tablet.

14. The device of claim 10, wherein the faceplate includes an opening sized to permit access to some but not all of a graphical user interface.

15. The device of claim 14, wherein a diameter of the opening is comparatively less than a dimension of a handset coupled to the secure electronic communication device.

16. The device of claim 15, including a gasket positioned entirely around a periphery of the opening to seal a portion of the electronic communication device from an environment external to the secure electronic communication device.

17. The device of claim 10, wherein the housing coupling member comprises a pin, and wherein the pin extends through an opening in the housing into an opening of a receiver included in the base to rotatably couple the housing to the base.

18. A method of forming a secure electronic communication device, comprising:
   positioning a housing adjacent to a baseplate, wherein the housing includes a cavity to house an electronic communication device;
   positioning the housing at least partially within a volume of a base including an integral handset receiver formed of a depression in a material of the base to receive a handset;
   coupling the base to the housing via a housing coupling member; and
   coupling the base to the baseplate via a baseplate coupling member to form the secure electronic communication device.

19. The method of claim 18, comprising disposing an electronic communication device within the cavity.

20. The method of claim 19, comprising rotating the housing to vary a viewing angle of the electronic communication device relative to a position of a user of the secure electronic communication device.

* * * * *